United States Patent
Nylander et al.

(10) Patent No.: US 10,440,531 B2
(45) Date of Patent: Oct. 8, 2019

(54) SERVICE DELIVERY IN A COMMUNICATION NETWORK

(71) Applicant: Telefonaktiebolaget LM Ericsson (publ), Stockholm (SE)

(72) Inventors: Tomas Nylander, Värmdö (SE); Ulf Mattsson, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/533,058

(22) PCT Filed: Dec. 23, 2014

(86) PCT No.: PCT/EP2014/079137
§ 371 (c)(1),
(2) Date: Jun. 5, 2017

(87) PCT Pub. No.: WO2016/101995
PCT Pub. Date: Jun. 30, 2016

(65) Prior Publication Data
US 2017/0353844 A1    Dec. 7, 2017

(51) Int. Cl.
*H04W 4/18*    (2009.01)
*H04W 28/16*   (2009.01)
(Continued)

(52) U.S. Cl.
CPC .............. *H04W 4/18* (2013.01); *H04L 69/24* (2013.01); *H04W 12/06* (2013.01);
(Continued)

(58) Field of Classification Search
CPC ..... H04L 2012/5692; H04L 2012/5638; H04L 2012/6445; H04L 47/70; H04L 47/724; H04L 47/78; H04L 47/781; H04L 29/06319; H04L 29/06326; H04L 29/387; H04L 29/08585; H04L 43/08;
(Continued)

(56) References Cited

U.S. PATENT DOCUMENTS

2007/0066280 A1* 3/2007 Arai .................. H04L 63/10
                                              455/411
2007/0204050 A1* 8/2007 Liu .................... H04L 47/14
                                              709/230
(Continued)

FOREIGN PATENT DOCUMENTS

EP    2779545 A1    9/2014
EP    2785104 A2    10/2014

*Primary Examiner* — Warner Wong
(74) *Attorney, Agent, or Firm* — Coats & Bennett, PLLC (57) ABSTRACT

A method and apparatus for providing information relating to delivery of a service from a server to a mobile device. A node in a Radio Access Network (RAN) receives from an interaction device an instruction message indicating that the mobile device is authorized to exchange service delivery information relating to delivery of the service from the server to the mobile device with the node in the RAN. The node can then exchange service delivery information with the mobile device. The interaction device need not maintain state, as it simply authorizes the mobile device to interact directly with the node in the RAN. Furthermore, signaling between the interaction device and the node in the RAN is reduced.

36 Claims, 8 Drawing Sheets

(51) Int. Cl.
  *H04L 29/06* (2006.01)
  *H04W 72/12* (2009.01)
  *H04W 12/06* (2009.01)
  *H04W 28/02* (2009.01)
  *H04W 76/00* (2018.01)

(52) U.S. Cl.
  CPC ....... *H04W 28/0268* (2013.01); *H04W 28/16* (2013.01); *H04W 72/1284* (2013.01); *H04W 76/00* (2013.01)

(58) Field of Classification Search
  CPC ............. H04L 43/0811; H04L 43/0876; H04L 43/0882; H04L 43/0884; H04L 43/0894; H04L 65/1069; H04L 67/141; H04W 12/06; H04W 28/16; H04W 28/0268; H04W 76/00; H04W 76/10; H04W 36/0011; H04W 40/24; H04W 40/246; H04W 40/248
  See application file for complete search history.

(56) References Cited

U.S. PATENT DOCUMENTS

| | | | |
|---|---|---|---|
| 2008/0175263 A1* | 7/2008 | Chen ....................... | H04L 47/11 370/431 |
| 2008/0273520 A1* | 11/2008 | Kim ....................... | H04L 47/78 370/345 |
| 2010/0330962 A1* | 12/2010 | Han ....................... | H04W 48/02 455/411 |
| 2014/0022904 A1 | 1/2014 | Ahmad et al. | |
| 2014/0254369 A1* | 9/2014 | Kulkarni ................. | H04L 12/12 370/235 |
| 2017/0181074 A1* | 6/2017 | Caldwell ............... | H04W 12/08 |
| 2017/0201456 A1* | 7/2017 | Siow ....................... | H04L 47/12 |

* cited by examiner

SERVICE DELIVERY IN A COMMUNICATION NETWORK

TECHNICAL FIELD

The invention relates to the field of providing service delivery information in a communication network.

BACKGROUND

Figure 1:
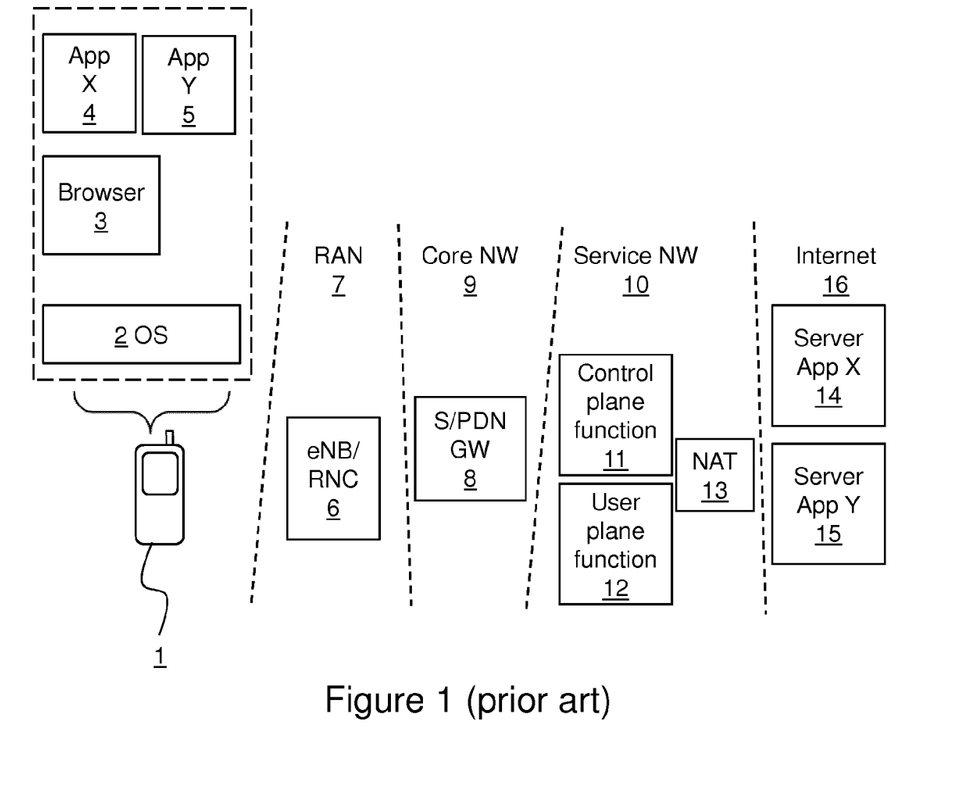
FIG. 1 illustrates schematically in a block diagram a known exemplary mobile network.

A mobile network is typically divided into different domains as illustrated in the exemplary communication network of FIG. 1. A mobile device 1 (termed herein a User Equipment, UE) is provided with an operating system 2, and for example, a web browser 3, App x 5, and App y 6. The Apps are software running or stored at the UE 1 that can request data services.

The UE 1 connects via an eNodeB (eNB) or Radio Network Controller (RNC) 6 to a mobile operator Radio Access Network (RAN) 7. The eNB and RNC are used by way of example only. It will be appreciated that any type of NodeB or network controller can be used depending on the Radio Access Technology (RAT) of the RAN 7. For example, in a Wi-Fi network the UE 1 (referred to as a Station in Wi-Fi) would connect via an Access Point (AP) and Access Controller (AC).

The mobile core network domain 9 includes mobile core nodes that link the RAN 7 to the service network 10. Examples of such nodes include a Serving Gateway (SGW), Packet Data Network Gateway (PGW) 8 and so on. The service network 10 includes functions such as a control plane function 11, a user plane function 12, and a Network Address Translation (NAT) function 13. Finally, user plane traffic reaches servers 14, 15 in the Internet 16 domain.

User plane traffic can be sent between App x 4 and its corresponding server 14, and between App y 5 and its corresponding server 15. Examples of servers are cache servers, video servers, web server, analytics servers and so on. It will be appreciated that many different types and combinations of servers can be used to provide services to Apps at the UE 1. Signalling between the servers 14, 15 and the Apps 4, 5 traverses the RAN 7, the Core network 9 and the service network 10.

There is a current desire to more closely link RAN 7 and service functionality together in order to optimize service delivery and radio resource usage. For example, data packets sent from a server 14 could be delayed if the RAN 7 is currently congested and experiencing delays. Access specific information is therefore useful for the server 14. It is also possible that the RAN 7 can make use of information relating to the server 14. Such information could be used, for example, for resource reservation.

One example where data destined for App x 4 and App y 5 in the UE 1 is an Adaptive Bit Rate feature. In this example, App x 4 is a video client which can decode video at different bit rates. End user experience or Quality of Experience (QoE) is a key differentiator for mobile operators and content providers. Adaptive Bit Rate allows a good QoE by adapting the bit rate by changing to an encoded format with a suitable bit rate depending on network conditions. Currently this is achieved by trying to estimating the throughput between the server 14 and App x 4 in the UE 1. This can be based on a measured link bit rate or round trip time. The frequency of adapting the bit rate varies. A typical interval for adaptive video streaming is around every 4 seconds.

Adaptive Bit Rate is implemented without any knowledge of conditions or capabilities of the RAN 7. Estimates of round trip time (RTT), bit rate and so on can give a misleading picture of conditions in the RAN 7. Furthermore, it takes some time for the end points to detect that there is a need to adapt to a lower or higher bit rate, and the interval between adaptations change is fairly long. This increases the risk of a poor QoE.

While the above example refers to adaptive bit rate for video services, it will be appreciated that similar issues arrive when delivering data services of any sort. For example, in order to improve QoE when delivering services in a congested network, an image could be sent at a lower resolution, an audio stream could be sent at a lower quality, a video could be sent using smaller frames. It will be appreciated that many service delivery parameters can be changed to optimize the service delivery, depending on the nature of the data being delivered.

There are initiatives to improve QoE by having RAN interaction with the service providers. In the above example network, there might be interaction between the RAN 7 and the servers 14, 15 to exchange and provide information to optimize the service delivery. Difficulties in implementing this include addressing problems, since no common identifier is easily available between the RAN 7 and the servers 14, 15, mainly due to the use of Network Address Translation (NAT) which modifies the UE IP address and disqualifies that identifier. Also there are scalability issues, as a server 14 may see connections from several hundred mobile networks, so it not trivial to determine the identity of the RAN with which network to establish a session for interaction and if the RAN supports the feature. Also it might be difficult to modify servers 14, 15 to use such an interaction protocol and to use information received from a RAN 7. Furthermore, not all protocols support adaptation such as adaptive bit rate.

SUMMARY

It is an object to improve the QoE of an end user by optimizing service delivery of data to a UE and to minimize signalling required between a mobile device, a node in the Radio Access Network and an interaction device.

According to a first aspect, there is provided a method of providing information relating to delivery of a service from a server to a mobile device. A node in a Radio Access Network (RAN) receives from an interaction device an instruction message indicating that the mobile device is authorised to exchange service delivery information relating to delivery of the service from the server to the mobile device with the node in the RAN. The node can then exchange service delivery information with the mobile device. An advantage of this technique is that the interaction device need not maintain state and keep a session open with the mobile device or the node in the RAN, as it simply authorises the mobile device to interact directly with the node in the RAN. Furthermore, signalling between the interaction device and the node in the RAN is reduced.

As an option, the method further comprises obtaining service delivery information relating to delivery of the service from the server to the mobile device and sending to the mobile device a second message, the second message including the obtained service delivery information.

Optional examples of the service delivery information include any of a recommended Media Rate, a recommended frame size, a recommended bit rate for the service, a buffer status (for example, the mobile device informing the node in the RAN of its buffer status), capabilities of the RAN, conditions in the RAN and addressing information relating to the mobile device. An example of a condition in the RAN is available bandwidth. An example of a capability of the RAN is an indication of supported signalling or features.

As an option, the method comprises receiving from the mobile device a request for service delivery information and in response, sending to the mobile device the service delivery information.

As an option, the instruction message further comprises a subscription request instructing the node to exchange service delivery information at intervals, thereby reducing repeated requests for service delivery information. As an alternative option, the method further comprises receiving, at the RAN node, from the mobile device a subscription request for repeated information relating to delivery of service from a server, and sending to the mobile device service delivery information at intervals.

As an option, the method further comprises receiving from the mobile device a third message, the third message including information relating to a condition at the mobile device, and taking an action at the node on the basis of the information relating to a condition at the mobile device. An example of information relating to the condition at the mobile device is buffer status at the mobile device.

The node in the RAN is optionally selected from any of an eNodeB, a Radio Network Controller, an Access Controller and an Access Point.

According to a second aspect, there is provided a method of providing, to a mobile device, information relating to delivery of a service from a server to the mobile device. An interaction device receives from the mobile device a request message relating to service delivery information relating to delivery of the service. The mobile device is authorised to exchange the requested service delivery information and so the interaction device sends to a node in the RAN an instruction message instructing the node in the RAN to exchange service delivery information with the mobile device.

As an option, the request message is any of a request for service delivery information, and a request for authorisation for the mobile device to exchange service delivery information with the node (6) in the Radio Access Network.

The request message is optionally a subscription request message, requesting that the service delivery information is exchanged at intervals.

Service delivery information is optionally selected from any of a recommended Media Rate, a recommended frame size, a recommended bit rate for the service, a recommended buffer level, capabilities of the RAN, conditions in the RAN and addressing information relating to the mobile device. An example of a condition in the RAN is available bandwidth. An example of a capability of the RAN is an indication of supported signalling or features.

According to a third aspect, there is provided a method of exchanging information relating to delivery of a service from a server to a mobile device. The mobile device sends to an interaction device a request message relating to service delivery information relating to delivery of the service. The mobile device then exchanges service delivery information with the node in the RAN.

As an option, the request message is any of a request for service delivery information, and a request for authorisation for the mobile device to exchange service delivery information with the node (6) in the Radio Access Network.

As an option, exchanging service delivery information with the node in the RAN comprises sending to the node information relating to a buffer status at the mobile device.

The method optionally further comprises sending to the node a subscription request for repeated service delivery information from the node. As a further option, the method comprises prior to sending the subscription request, determining the occurrence of any of a RAN handover and expiry of a Radio Access Bearers timer.

According to a fourth aspect, there is provided a node configured for use in a RAN. The node is provided with a first receiver configured to receive from an interaction device an instruction message indicating that a mobile device is authorised to exchange service delivery information relating to delivery of the service from a server to the mobile device with the node in the RAN. A first transmitter and a second receiver are provided to exchange service delivery information with the mobile device.

As an option, the node further comprises a processor configured to obtain the service delivery information relating to delivery of the service from the server to the mobile device. The first transmitter is configured to send to the mobile device a second message, the second message including the obtained service delivery information.

The second receiver is optionally configured to receive from the mobile device a subscription request for repeated information relating to delivery of service from a server, and the first transmitter is configured to send to the mobile device service delivery information at intervals.

The second receiver is optionally configured to receive from the mobile device a third message, the third message including information relating to a condition at the mobile device, and the processor is configured to take an action at the node on the basis of the information relating to a condition at the mobile device.

The node is optionally selected from any of an eNodeB, a Radio Network Controller, an Access Controller and an Access Point.

According to a fifth aspect, there is provided an interaction device for use in a communications network. The interaction device is provided with a first receiver arranged to receive from a mobile device a request message relating to service delivery information relating to delivery of a service. A processor is configured to authorise the mobile device to exchange the requested service delivery information with a node in a RAN. A first transmitter is configured to send to the node in the RAN an instruction message instructing the node in the RAN to exchange service delivery information with the mobile device.

According to a sixth aspect, there is provided a mobile device for use in a communication network. The mobile device is provided with a first transmitter configured to send to an interaction device a request message relating to service delivery information relating to delivery of a service. A second transmitter and a first receiver are configured to exchange service delivery information with the node in the RAN.

As an option, the second transmitter is configured to send to the node a subscription request for repeated service delivery information from the node. As a further option, the mobile device is provided with a processor configured to, prior to sending the subscription request, determine the occurrence of any of a RAN handover and expiry of a Radio Access Bearers timer.

According to a seventh aspect, there is provided a computer program, comprising instructions which, when executed on at least one processor, cause the at least one processor to carry out the method according to any one of first, second or third aspects described above.

According to an eighth aspect, there is provided a carrier containing the computer program described above in the seventh aspect, wherein the carrier is one of an electronic signal, optical signal, radio signal, or non-transitory computer readable storage medium.

DETAILED DESCRIPTION

The following description refers to a UE 1, but it will be appreciated that the same principles apply to any mobile device that connects to a communication network via a Radio Access Network (RAN), and regardless of the Radio Access Technology (RAT) used. Furthermore, the following description uses the example of adjusting a bit rate for delivery of video services according to recommendations made depending on conditions and/or capabilities of the RAN. It will be appreciated that any type of service delivery parameter may be adjusted to optimize delivery of a service and thereby enhance the QoE for the end user.

Figure 2:
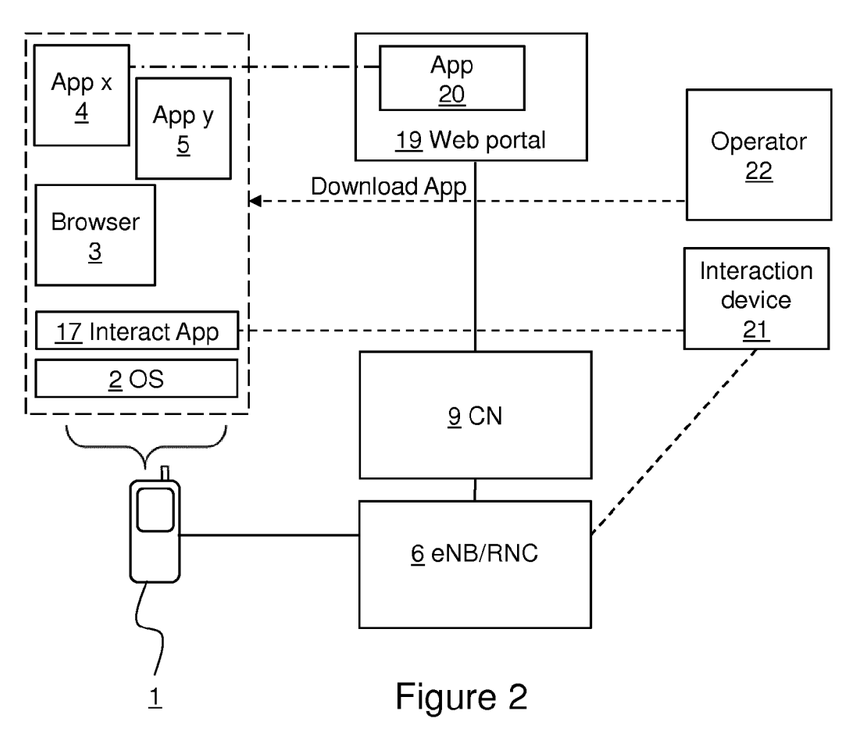
FIG. 2 illustrates schematically in a block diagram an exemplary mobile network.

FIG. 2 illustrates schematically an exemplary network using a RAN. A UE 1 has an interaction client 17 (shown as Interaction App in FIG. 2) to allow the UE 1 to obtain and use service delivery parameters. The UE 1 connects to the RAN 7. In this example, a web portal 19 provides a service in which data is provided from App 20 to App x 4 at the UE 1. An interaction device 21 is located in the network, which communicated with the interaction client 17. The interaction client 17 may be provided by an operator 22.

The interaction client 17 is shown as a standalone client, but it will be appreciated that it could alternatively be implemented as a web browser plugin or part of the UE Operating System 2 or part of an existing App. In an exemplary embodiment, the interaction device 21 informs the UE 1 about appropriate recommendations for service delivery parameters depending on, for example, conditions and capabilities of the RAN 7. This allows the UE to use the recommended service delivery parameters when requesting data from a server.

For example, if the web portal 19 is providing a streaming video service from the App 20 to App x 4 at the UE 1, the service delivery parameter might be an optimum bit rate. A recommended optimum bit rate may be provided to the interaction device 21, which in turn provides the recommended optimum bit rate to the UE 1. When App x 4 requests a video segment, it includes the recommended optimum bit rate in the request, and the App 20 provides the video using the recommended optimum bit rate. The recommended optimum bit rate may change dynamically over time depending on conditions in the RAN 7, allowing the streaming video service to be maintained even in circumstances where conditions on the RAN 7 deteriorate. This ensures a consistent QoE for the end-user.

While bit rate adaption is used as an example throughout, it will be appreciate that other types of service delivery parameter may be used depending on the type of service. For example, a degree of compression for streaming audio may be dynamically adapted, video resolution may be dynamically adapted, or recommendations about client buffer size may be made. Any type of content adaption may be used where the UE 1 requests delivery of the content in a suitable format/resolution depending on the recommended service delivery parameter. The type of service delivery parameter is determined when the UE 1 sends information to the interaction device 21. Sent information may include, for example, an indication that adaptive video is possible, supported media rates, duration of each media segment, buffer capabilities and so on, allowing the interaction device 21 to ensure that only relevant information is provided to the UE 1.

The UE 1 is connected to the RAN 7 and establishes a session with the interaction device 21. During session establishment, the UE 1 provides the interaction device 21 with information relating to the service that the UE 1 is (or will be) using. This may be an indication of the type of service, or the type of service delivery parameter for which a recommendation or other information is required. For example, the UE 1 may inform the interaction device 21 that it requires service delivery parameter for adaptive video and inform the interaction device 21 of any restrictions on the adaptive video (supported media rates, duration of media segments etc.).

The UE receives information relating to the RAN from a remote node. The remote node may be the interaction device 21 or a node/function in the RAN. The information may be a recommended service delivery parameter or information usable by the UE to derive a recommended service delivery parameter. If network operator control is desirable then it is preferred to send the recommended service delivery parameter to the UE rather than information from which the UE 1 can derive the recommended service delivery parameter.

The UE 1 establishes the service delivery parameter and sends a request to the server 14 for data, the request including the service delivery parameter. The server uses the received service delivery parameter to, if necessary, adapt the requested data before sending it to the UE 1.

Using this approach, for each active UE in a RAN node, a communication session is established between the RAN 7 and the interaction device 21. This allows the interaction device 21 to know that the RAN 7 supports this kind of functionality. Otherwise the interaction device 21 might send messages intended for the RAN 7, but if the RAN 7 does not support this, the messages are sent to the UE 1, which unnecessarily loads the air interface, and might cause disturbance if sent to a UE 1 that does not expect the messages. For each state transition of the UE 1, communication session is set up between the RAN 7 and the interaction device 21, and so state is kept at the interaction device 21 and signalling is increased. This can be mitigated by allowing a node in the RAN 7 (such as an eNB/RNC) to send data directly to the UE 1. However, the RAN 7 must know whether it is an authorized service that requests the info and that the subscriber associated with the UE 1 is trusted to receive the info. Currently, RAN nodes 7 are not aware of service delivery information, nor does the RAN 7 perform authentication/authorization functions. Furthermore, the RAN 7 must know the identity of the UE 1 that the message applies to. After a handover, a new RAN 7 must know if it should send information. Finally, the RAN 7 should not send messages when the UE 1 is about to go to an IDLE state or when it is in an IDLE state.

Providing information about delivery of a service from the node 6 in the RAN 7 allows the interaction device to be stateless. The node 6 in the RAN is not configured to authenticate the UE 1 and determine that it has permission to receive the relevant information, and so the interaction device provides this service before responding to the UE 1, and informs the node 6 in the RAN 7 that the UE 1 is authorised to send and receive service deliver information directly with the node 6 in the RAN 7. The RAN node 7 intercepts this response and exchanges service delivery information directly with the UE 1.

Figure 3:
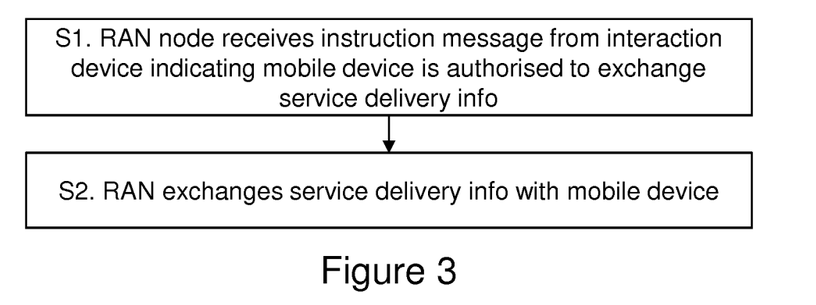
FIG. 3 is a flow diagram illustrating exemplary steps at a Radio Access Network node.

FIG. 3 is a flow diagram showing steps at the node 6 in the RAN 7. The following numbering corresponds to that of FIG. 3:

S1. The node 6 in the RAN 7 receives an instruction message from the interaction device 21 informing the node 6 in the RAN 7 that the UE 1 (or a client 4, 5) in the UE 1 is authorised to exchange service delivery information. An example of service delivery information is available bandwidth in the RAN. The UE 1 can use this information to determine a parameter with which to request a service from a server providing the service, such as bit rate. Other examples of the service delivery information include any of a recommended Media Rate, a recommended frame size, a recommended bit rate for the service, a buffer status, capabilities of the RAN, conditions in the RAN and addressing information relating to the mobile device. The instruction message includes addressing information such as an IP address and port at which the UE 1 expects to receive the service delivery information.

S2. Using the addressing information, the UE 1 and the node 6 in the RAN 7 exchange service delivery information. Note that the node 6 in the RAN 7 may be any suitable node, such as an eNodeB, a Radio Network Controller, an Access Controller and an Access Point, although other types of node in other types of Radio Access Network may also apply the same techniques.

Figure 4:
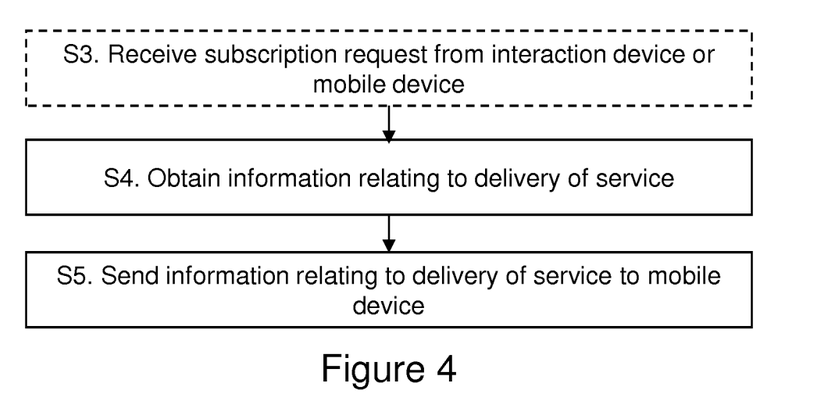
FIG. 4 is a flow diagram illustrating further exemplary steps at the Radio Access Network node.

It may be advantageous for the service delivery information to be requested using a subscription request. This reduces repeated signalling requesting service delivery information. The subscription request may come from the interaction device 21 or, once the node 6 in the RAN 7 is aware that the UE 1 is authorised to receive the service delivery information, it may be sent to the node 6 in the RAN 7 from the UE 7. FIG. 4 shows these steps, with the following numbering corresponding to that of FIG. 4:

S3. The node 6 in the RAN 7 receives (from the interaction device 21 or the UE 1) a subscription request for service delivery information.

S4. The node 6 in the RAN obtains the service delivery information (such as available bandwidth in the RAN 7).

S5. The node 6 in the RAN 7 exchanges the service delivery information at intervals to the UE 1. Note that intervals may, depending on the nature of the subscription request, be at certain times or whenever a condition (such as available bandwidth in the RAN 7) changes. Note that similar signalling may be used for a "one-time" request for service delivery information.

Figure 5:
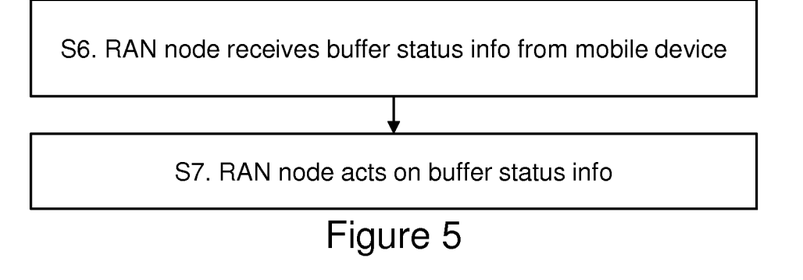
FIG. 5 is a flow diagram illustrating further exemplary steps at the Radio Access Network node.

Authorising the UE 1 to exchange service delivery information with the node 6 in the RAN 7 also allows information to be sent from the UE 1 to the node 6 in the RAN 7. For example, the UE 1 could send a message to the RAN 7 informing it of the buffer status in the UE 1, and the node 6 in the RAN can then take action accordingly. FIG. 5 illustrates this, with the following numbering corresponding to that of the Figure:

S6. The node 6 in the RAN 7 receives information (such as buffer status) relating to a condition at the UE 1.

S7. The node 6 in the RAN 7 takes a suitable action depending on the received information.

Figure 6:
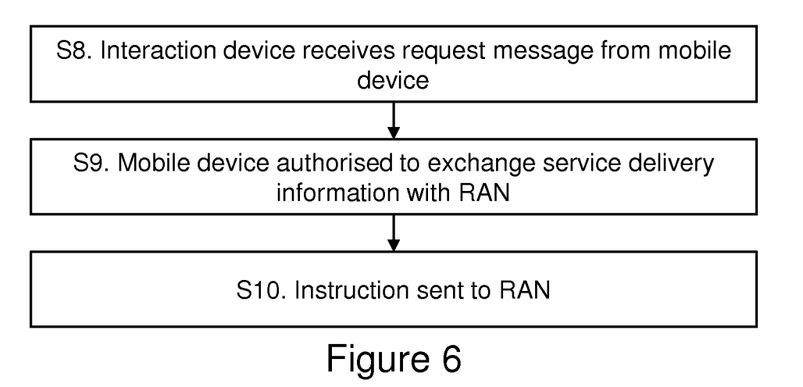
FIG. 6 is a flow diagram illustrating exemplary steps at an interaction device.

FIG. 6 is a flow diagram showing steps from the point of view of the interaction device 21. The following numbering corresponds to that of FIG. 6:

S8. The interaction device 21 receives a request message from the UE 1 relating to service delivery information. This may be a request for service delivery information, in which case the interaction device uses this request as a trigger to authorise the UE 1 to exchange service delivery information with the node 6 in the RAN 7. The request message is alternatively a request from the UE 1 to authorise the UE 1 to exchange service delivery information with the node 6 in the RAN 7.

S9. The interaction device 21 authorises the UE 1 to exchange service delivery information with the node 6 in the RAN 7. This may depend, for example, on the nature of a user's subscription or capabilities of the UE 1 and/or the RAN.

S10. The interaction device 21 sends an instruction to the node 6 in the RAN 7, allowing the node 6 in the RAN 7 to exchange service delivery information with the UE 1.

Figure 7:
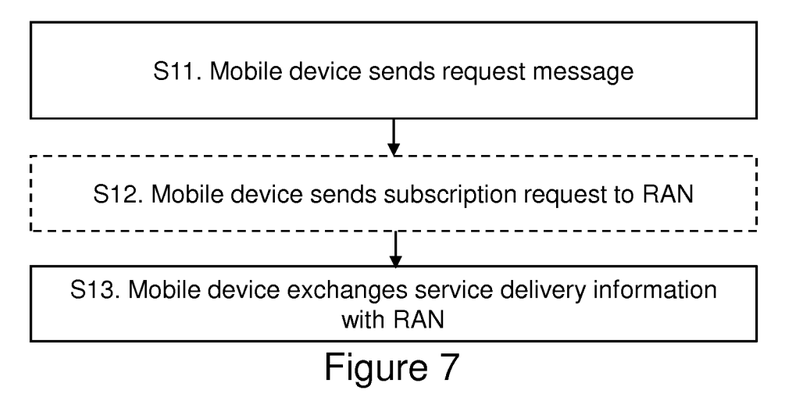
FIG. 7 is a flow diagram illustrating exemplary steps at a mobile device.

FIG. 7 is a flow diagram showing steps from the point of view of the UE 1. The following numbering corresponds to that of FIG. 7:

S11. The UE 1 sends a request to the interaction device 21 relating to service delivery information. This may be a request for authorisation to exchange service delivery information with the node 6 in the RAN 7. Alternatively, the UE 1 simply sends a request for the service delivery information, which the interaction 21 can use as a trigger to authorise the UE 1 to exchange service delivery information with the node 6 in the RAN 7.

S12. In an optional embodiment, the UE 1 sends a subscription request for service delivery information to the node 6 in the RAN 7.

S13. The UE 1 and the node 6 in the RAN 7 exchange service delivery information.

Figure 8:
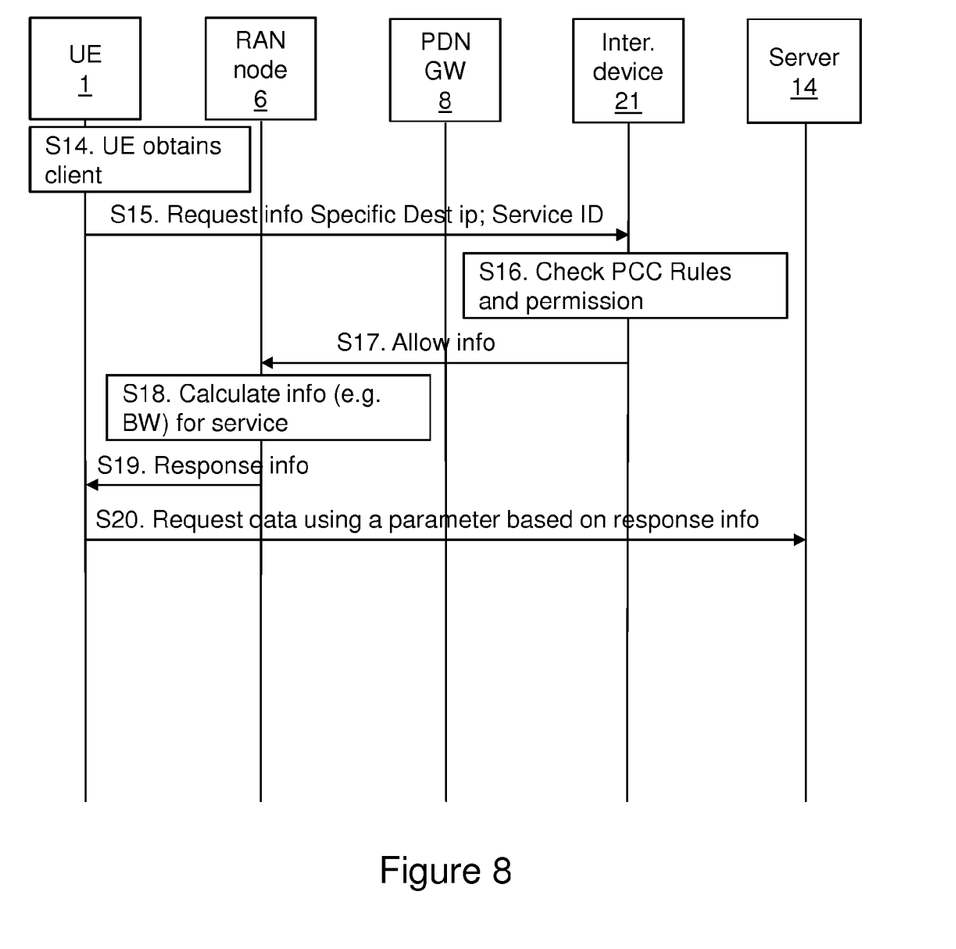
FIG. 8 is a signalling diagram showing exemplary signalling.

Turning now to FIG. 8, there is shown an exemplary signalling diagram. The following numbering corresponds to that of FIG. 8:

S14. The UE 1 obtains a client (such as an App) which can communicate with the node 6 in the RAN 7 to exchange service delivery information relating to delivery of a service from the server 14. The client may be realized in the modem, in the Operating System (OS), as a stand-alone app or as a part of another app.

S15. The UE 1 sends requests for information to a specific IP-address identifying the interaction device 21. A service-ID might also be added to identify the requesting application. Request also includes information about which port service delivery information should be sent to.

S16. The interaction device 21 checks the subscription and service-ID and authorizes the UE 1 (or the client at the UE 1) to exchange service delivery information with the node 6 in the RAN 7.

S17. The interaction device 21 sends a message to the node 6 in the RAN 7 informing the node 6 in the RAN 7 that the UE 1 is authorized to exchange service delivery information with the node 6 in the RAN 7. This message includes UEs 1 IP-address and port for the node 6 in the RAN 7 to use as the destination when sending messages relating to service delivery to the UE 1.

S18. In the example where the service delivery information is the available bandwidth in the RAN 7, the node 6 in the RAN 7 determines the service delivery information.

S19. The node 6 in the RAN 7 sends the service delivery information to the UE 1 on the same port as the client indicated in message S12.

S20. The UE 1 can then request delivery of a service from the server 14 using a parameter based in the service delivery information received in step S16.

Using the above signaling, in the event that the node 6 in the RAN 7 does not support this signaling, the message sent in step S14 would be sent to the UE using the indicated port. The lack of service delivery information would inform the UE 1 that the RAN 7 does not support the feature of exchange of service delivery information between the UE 1 and the node 6 in the RAN 7.

To optimize signaling and latency for use cases based on query/response procedures, a subscription mechanism may be applied. This allows a single query from the client to trigger continuous reporting from the node 6 in the RAN 7. The subscription request may be sent from the UE 1 to the interaction device and forwarded to the node 6 in the RAN 6, or may be subsequently sent (after authorization) directly from the UE 1 to the node 6 in the RAN 7.

For handover between different RANs the client at the UE 1 is aware of handover and when a change is found a new request is sent to a new node in the new RAN. For IDLE connect state changes a maximum inactivity time parameter is sent down to the client. The inactivity timer is lower than the RAB inactivity timer. The client uses this to send a new request to the interaction device (or node 6 in the RAN 7) if no data has been flowing during a period equal or larger to this parameter and if it wishes to continue receiving/sending data again.

Figure 9:
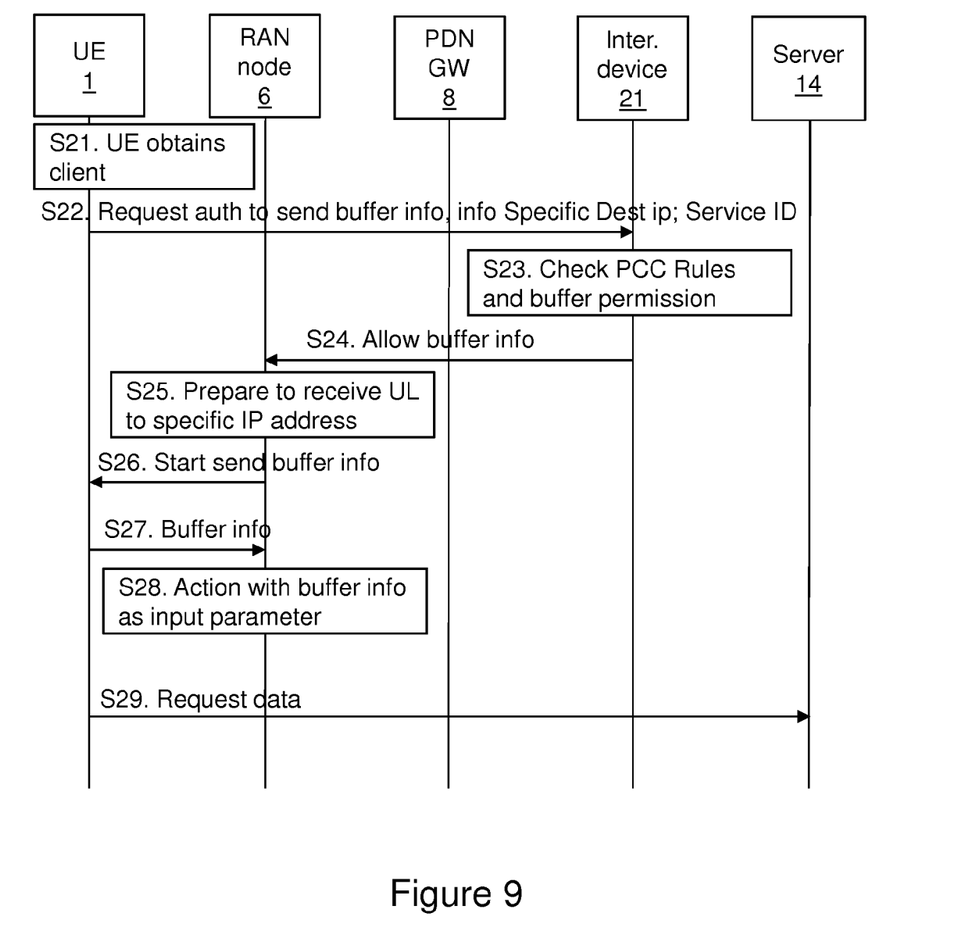
FIG. 9 is a signalling diagram, also showing exemplary signalling.

FIG. 9 is a signaling diagram showing exemplary signaling where the UE 1 sends information to the node 6 in the RAN 7 about a condition at the UE 1. In this example, the condition at the UE 1 is its buffer status. Since this type of information requires fast and fairly intensive signaling a direct communication between the UE 1 and the node 6 in the RAN 7 lowers latency. The following numbering corresponds to that of FIG. 9.

S21. The UE 1 obtains a client (such as an App) which can communicate with the node 6 in the RAN 7 to exchange service delivery information relating to delivery of a service from the server 14. The client may be realized in the modem, in the Operating System (OS), as a stand-alone app or as a part of another app.

S22. The UE 1 sends requests for authorisation to send buffer status information to a specific IP-address identifying the interaction device 21. A service-ID might also be added to identify the requesting application.

S23. The interaction device 21 checks the subscription and service-ID and authorizes the UE 1 (or the client at the UE) to send buffer status information to the node 6 in the RAN 7.

S24. The interaction device 21 sends a message to the node 6 in the RAN 7 informing the node 6 in the RAN 7 that the UE 1 is authorized to send buffer status information to the node 6 in the RAN 7.

S25. The node 6 in the RAN 7 prepares to receive uploaded buffer status information to a specific IP address.

S26. The node 6 in the RAN 7 informs the UE 1 that it may send buffer status information to the node 6 in the RAN 7.

S27. The UE 1 sends buffer status information to the node 6 in the RAN 7.

S28. The node 6 in the RAN 7 takes an appropriate action depending on the received buffer status information.

S29. The UE 1 can then request delivery of a service from the server 14.

If the UE 1 attaches to a node in a RAN that is not configured to handle the signaling described above, then the interaction device 21 receives a "UDP: Buffer info" message from the UE 1. The interaction device 21 sends a cancel message to the client at the UE 1. The UE 1 stops sending buffer info. Alternatively, the interaction device 21 could just drop the message from the UE 1, and the lack of response would inform the UE 1 that the signaling is not supported by this RAN node. IDLE connect state change is not an issue because buffer status information is sent with a frequency higher than RAN timers for RAB tear down.

Figure 10:
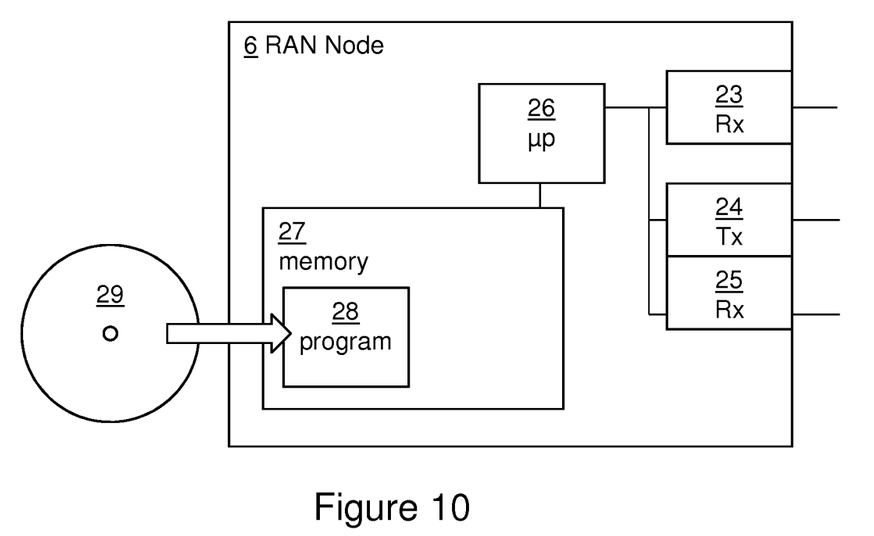
FIG. 10 illustrates schematically in a block diagram an exemplary Radio Access Node.

FIG. 10 illustrates schematically in a block diagram an exemplary node 6 for use in a RAN 7. The node is provided with a first receiver 23 configured to receive from the interaction device 21 an instruction message indicating that the UE 1 is authorised to exchange service delivery information relating to delivery of the service from a server to the UE with the node 6. A first transmitter 24 and a second receiver 25 are configured to exchange service delivery information with the UE 1. A processor 26 is provided, configured to obtain the service delivery information (such as available bandwidth). The first transmitter 24 is configured to send service delivery information to the UE. The second receiver 25 is configured to receive from the UE 1 a single request or a subscription request for the service delivery information. The second receiver 25 is configured to receive from the UE 1 a message that includes information relating to a condition at the UE 1, such as buffer status, in which case the processor 26 is further configured to take an action at the node 6. Examples of such a node include an eNodeB, a Radio Network Controller, an Access Controller and an Access Point.

A non-transitory computer readable medium in the form of a memory 27 may be provided. This may be used to store a program 28 which, when executed by the processor 26, causes the node 6 to behave as described above. The program 28 may alternatively be provided via another medium 29, such as an external storage medium, an electronic signal, optical signal, radio signal, or non-transitory computer readable storage medium.

Note that the transmitters and receivers described above may be physically implemented in any suitable configuration (for example, a single transceiver, a single transmitter that performs the functions of both the first and second transmitters, and so on).

Figure 11:
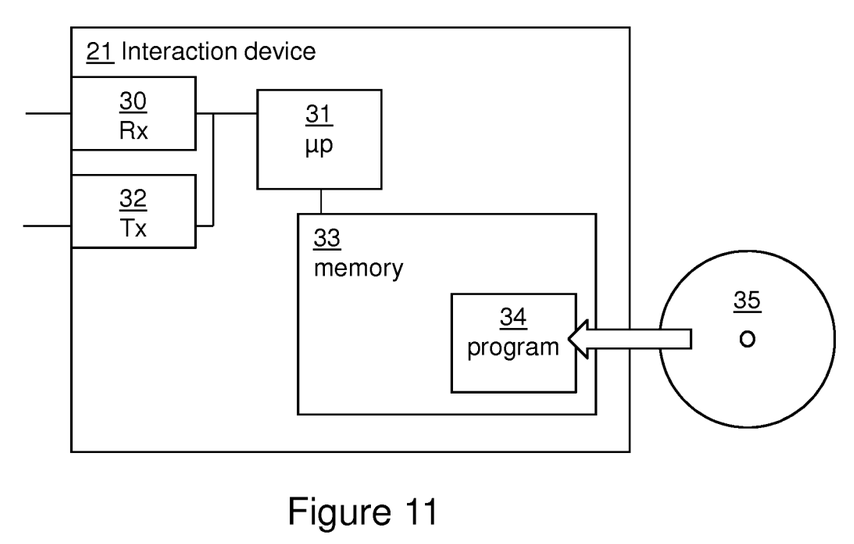
FIG. 11 illustrates schematically in a block diagram an exemplary interaction device.

FIG. 11 illustrates schematically an exemplary interaction device 21. The interaction device is provided with a first receiver 30 arranged to receive from the UE 1 a request message requesting authorisation to exchange service delivery information between the UE 1 and the node 6 in the RAN 7. A processor 31 is configured to authorise the UE 1 to exchange the requested service delivery information with the node 6 in the RAN 7. A first transmitter 32 is configured to send to the node 6 in the RAN 7 an instruction message instructing the node 6 in the RAN 7 to exchange service delivery information with the UE 1.

A non-transitory computer readable medium in the form of a memory 33 may be provided. This may be used to store a program 34 which, when executed by the processor 31, causes the interaction device 21 to behave as described above. The program 34 may alternatively be provided via another medium 35, such as an external storage medium, an electronic signal, optical signal, radio signal, or non-transitory computer readable storage medium.

Note that the transmitters and receivers described above may be physically implemented in any suitable configuration (for example, a single transceiver, a single transmitter that performs the functions of both the first and second transmitters, and so on).

Figure 12:
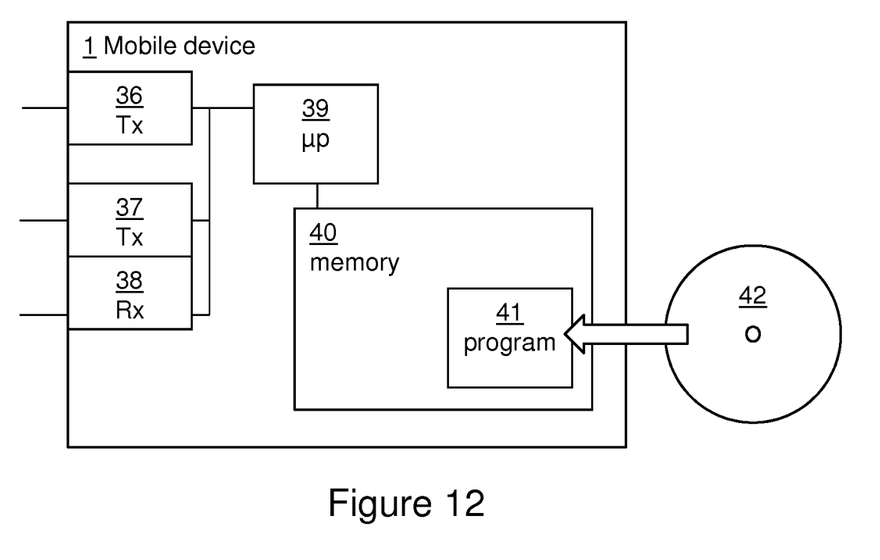
FIG. 12 illustrates schematically in a block diagram an exemplary mobile device.

FIG. 12 illustrates an exemplary UE 1. The UE 1 is provided with a first transmitter 36 configured to send to the interaction device 21 a request for authorisation to exchange service delivery information relating to delivery of the service with the node 6 in the RAN 7. A second transmitter 37 and a first receiver 38 are configured to exchange service delivery information with the node 6 in the RAN 7. The second transmitter 37 may be configured to send to the node 6 in the RAN a request for one-time service delivery information or a subscription request for repeated service delivery information from the node 6 in the RAN 7. A processor 39 is provided, configured to, prior to sending the subscription request, determine the occurrence of any of a RAN handover and expiry of a RAB timer.

A non-transitory computer readable medium in the form of a memory 40 may be provided. This may be used to store a program 41 which, when executed by the processor, causes the UE 1 to behave as described above. The program 40 may alternatively be provided via another medium 42, such as an external storage medium, an electronic signal, optical signal, radio signal, or non-transitory computer readable storage medium.

Note that the transmitters and receivers described above may be physically implemented in any suitable configuration (for example, a single transceiver, a single transmitter that performs the functions of both the first and second transmitters, and so on).

The techniques described above improve the end user QoE by ensuring that a suitable service delivery parameter is used for delivered data using feedback about conditions/capabilities in the RAN. Note that other factors may be taken into account, such as a level of a user's subscription; for example, a user with a high priority level type of subscription may be able to stream video at a higher resolution than a user with a lower level of subscription. The interaction between the UE 1 and the interaction device 21 supports this without impacting the server providing the data. There is no need for a dedicated communication session between the UE 1 and the interaction device 21; the interaction device simply informs the node 6 in the RAN 7 that the UE 1 is authorised to exchange service delivery information with the node 6 in the RAN 7. This reduces signalling required and latency, and reduces the processing and memory requirements at the interaction device 21.

It will be appreciated by the person of skill in the art that various modifications may be made to the above-described embodiments without departing from the scope of the present invention. For example, any type of service delivery parameter may be used. Furthermore, the same principles can be adapted to any type of network where a device accesses a communications network using a RAN, such as UTRAN, E-UTRAN, Wi-Fi and so on.

The following abbreviations have been used in the above description:

AC Access Controller
AP Access Point
eNB eNodeB
NAT Network Address Translation
OS Operating System
PGW Packet Data Network Gateway
QoE Quality of Experience
RAB Radio Access Bearers
RAN Radio Access Network
RAT Radio Access Technology
RTT round trip time
RNC Radio Network Controller
SGW Serving Gateway
TCP Transmission Control Protocol
UDP User Datagram Protocol
UE User Equipment

The invention claimed is:

1. A method of providing information relating to delivery of a service from a server to a mobile device, the method comprising, at a node in a Radio Access Network:
    setting up a communication session between the node in the Radio Access Network and an interaction device;
    receiving, from the interaction device, an instruction message indicating that the mobile device is authorized to exchange service delivery information directly with the node in the Radio Access Network without keeping the communication session open, wherein the service delivery information is related to delivery of the service from the server to the mobile device with the node in the Radio Access Network; and
    exchanging the service delivery information with the mobile device following the interaction device receiving communication directly from the mobile device.

2. The method of claim 1, further comprising:
    obtaining the service delivery information related to delivery of the service from the server to the mobile device; and
    sending, to the mobile device, a second message, the second message including the obtained service delivery information.

3. The method of claim 1, wherein the service delivery information is selected from any of: a recommended Media Rate, a recommended frame size, a recommended bit rate for the service, a buffer status, capabilities of the Radio Access Network, conditions in the Radio Access Network, and addressing information relating to the mobile device.

4. The method of claim 1, wherein the instruction message comprises a subscription request instructing the node to exchange the service delivery information at intervals.

5. The method of claim 1, further comprising receiving, from the mobile device, a request for the service delivery information and in response, sending to the mobile device the service delivery information.

6. The method of claim 1, further comprising:
    receiving, from the mobile device, a subscription request for repeated information relating to delivery of service from a server; and
    sending to the mobile device the service delivery information at intervals.

7. The method of claim 1, further comprising:
receiving, from the mobile device, a third message, the third message including information relating to a condition at the mobile device; and
taking an action at the node based on the information relating to a condition at the mobile device.

8. The method of claim 7, wherein the information relating to the condition at the mobile device comprises buffer status at the mobile device.

9. The method of claim 1, wherein the node in the Radio Access Network is selected from any of an eNodeB, a Radio Network Controller, an Access Controller, and an Access Point.

10. A method of providing, to a mobile device, information relating to delivery of a service from a server to the mobile device, the method comprising, at an interaction device:
receiving, directly from the mobile device, a request message relating to service delivery information relating to delivery of the service;
authorizing the mobile device to exchange the requested service delivery information directly with a node in the Radio Access Network; and
sending, to the node in the Radio Access Network, an instruction message instructing the node in the Radio Access Network to exchange the service delivery information with the mobile device.

11. The method of claim 10, wherein the request message is any of: a request for the service delivery information, and a request for authorization for the mobile device to exchange the service delivery information with the node in the Radio Access Network.

12. The method of claim 10, wherein the request message is a subscription request message, requesting that the service delivery information is exchanged at intervals.

13. The method of claim 10, wherein the service delivery information is selected from any of: a recommended Media Rate, a recommended frame size, a recommended bit rate for the service, a recommended buffer level, capabilities of the Radio Access Network, conditions in the Radio Access Network, and addressing information relating to the mobile device.

14. A method of exchanging information relating to delivery of a service from a server to a mobile device, the method comprising, at the mobile device:
sending, directly to an interaction device, a request message requesting authorization to exchange service delivery information directly with a node in the Radio Access Network, wherein the service delivery information is related to delivery of the service; and
exchanging directly the service delivery information with the node in the Radio Access Network.

15. The method of claim 14, wherein the request message is any of: a request for the service delivery information, and a request for authorization for the mobile device to exchange the service delivery information with the node in the Radio Access Network.

16. The method of claim 14, wherein the exchanging the service delivery information with the node in the Radio Access Network comprises sending to the node information relating to a buffer status at the mobile device.

17. The method of claim 14, further comprising, prior to the sending the request message, determining the occurrence of any of: a Radio Access Network handover, and expiry of a Radio Access Bearers timer.

18. The method of claim 14, further comprising sending to the node in the Radio Access Network, a request for the service delivery information.

19. The method of claim 14, further comprising sending, to the node in the Radio Access Network, a subscription request for repeated service delivery information from the node.

20. The method of claim 19, further comprising, prior to the sending the subscription request, determining the occurrence of any of: a Radio Access Network handover, and expiry of a Radio Access Bearers timer.

21. A node configured for use in a Radio Access Network, the node comprising:
a processor configured to set up a communication session between the node and an interaction device;
a first receiver configured to receive from the interaction device an instruction message indicating that a mobile device is authorized to exchange service delivery information directly with the node without keeping the communication session open, wherein the service delivery information is related to delivery of a service from a server to the mobile device with the node in the Radio Access Network; and
a first transmitter and a second receiver configured to exchange the service delivery information with the mobile device following the interaction device receiving communication directly from the mobile device.

22. The node of claim 21:
further comprising processing circuitry configured to obtain the service delivery information related to delivery of the service from the server to the mobile device; and
wherein the first transmitter is configured to send, to the mobile device, a second message, the second message including the obtained service delivery information.

23. The node of claim 22:
wherein the second receiver is configured to receive, from the mobile device, a subscription request for repeated information relating to delivery of service from a server; and
wherein the first transmitter is configured to send to the mobile device the service delivery information at intervals.

24. The node of claim 22:
wherein the second receiver is configured to receive, from the mobile device, a third message, the third message including information relating to a condition at the mobile device; and
wherein the processing circuitry is configured to take an action at the node based on the information relating to a condition at the mobile device.

25. The node of claim 22, wherein the node is selected from any of: an eNodeB, a Radio Network Controller, an Access Controller, and an Access Point.

26. An interaction device for use in a communications network, the interaction device comprising:
a first receiver configured to receive, from a mobile device, a request message relating to service delivery information relating to delivery of a service from a server to a mobile device;
processing circuitry configured to authorize the mobile device to exchange the requested service delivery information with a node in a Radio Access Network; and
a first transmitter configured to send, to the node in the Radio Access Network, an instruction message instructing the node in the Radio Access Network to exchange service delivery information with the mobile device.

27. A mobile device for use in a communication network, the mobile device comprising:
   a first transmitter configured to send, directly to an interaction device, a request message requesting authorization to exchange service delivery information directly to a node in a Radio Access Network, wherein the service delivery information is related to delivery of a service from a server to the mobile device; and
   a second transmitter and a first receiver configured to exchange the service delivery information with the node in the Radio Access Network.

28. The mobile device of claim 27, wherein the second transmitter is configured to send, to the node, a subscription request for repeated service delivery information from the node.

29. The mobile device of claim 28, further comprising processing circuitry configured to, prior to sending the subscription request, determine the occurrence of any of: a Radio Access Network handover, and expiry of a Radio Access Bearers timer.

30. A non-transitory computer readable recording medium storing a computer program product for providing information relating to delivery of a service from a server to a mobile device, the computer program product comprising software instructions which, when run on processing circuitry of a node in a Radio Access Network, causes the node to:
   set-up a communication session between the node in the Radio Access Network and an interaction device;
   receive, from the interaction device, an instruction message indicating that the mobile device is authorized to exchange service delivery information directly with the node in the Radio Access Network without keeping the communication session open, wherein the service delivery information is related to delivery of the service from the server to the mobile device with the node in the Radio Access Network; and
   exchange the service delivery information with the mobile device following the interaction device receiving communication directly from the mobile device.

31. A non-transitory computer readable recording medium storing a computer program product for providing, to a mobile device, information relating to delivery of a service from a server to the mobile device, the computer program product comprising software instructions which, when run on processing circuitry of an interaction device, causes the interaction device to:
   receive, directly from the mobile device, a request message relating to service delivery information relating to delivery of the service;
   authorize the mobile device to exchange the requested service delivery information directly with a node in a Radio Access Network; and
   send, to the node in the Radio Access Network, an instruction message instructing the node in the Radio Access Network to exchange the service delivery information with the mobile device.

32. A non-transitory computer readable recording medium storing a computer program product for exchanging information relating to delivery of a service from a server to a mobile device, the computer program product comprising software instructions which, when run on processing circuitry of the mobile device, causes the mobile device to:
   send, directly to the interaction device, a request message requesting authorization to exchange service delivery information directly with a node in a Radio Access Network, wherein the service delivery information is related to delivery of the service; and
   exchange directly the service delivery information with the node in the Radio Access Network.

33. The method of claim 1, wherein the interaction device is another node in the Radio Access Network.

34. The method of claim 10, wherein the interaction device is another node in the Radio Access Network.

35. The method of claim 14, wherein the interaction device is another node in the Radio Access Network.

36. The method of claim 10, wherein the method further comprises setting up a communication session between the radio access node and the interaction device, and wherein authorizing the mobile device to exchange the requested service delivery information comprises authorizing the mobile device to exchange the requested service delivery information directly with the radio access node without keeping the communication session open.

* * * * *